United States Patent [19]
Darnell et al.

[11] Patent Number: 5,953,848
[45] Date of Patent: Sep. 21, 1999

[54] ENVIRONMENTALLY FRIENDLY FISHING LURE CONSTRUCTION

[76] Inventors: Charles Darnell, 35 Williamson St., Edwardsville, Kans. 66113; Dennis Ray Watson, 205 Maple St., P.O. Box 251, Lathrop, Mo. 64465

[21] Appl. No.: 08/911,575

[22] Filed: Aug. 14, 1997

[51] Int. Cl.⁶ ................................. A01K 85/12
[52] U.S. Cl. ................. 43/42.19; 43/42.28; 43/42.33; 43/42.39
[58] Field of Search ................. 43/42.28, 42.31, 43/42.33, 42.39, 42.45, 42, 42.46, 42.19, 42.21, 42.2, 42.49

[56] References Cited

U.S. PATENT DOCUMENTS

| | | | |
|---|---|---|---|
| D. 320,429 | 10/1991 | Williams, Jr. | D22/129 |
| 3,638,347 | 2/1972 | Kochevar | 43/42.39 |
| 4,006,552 | 2/1977 | Cunningham | 43/42.48 |
| 4,329,804 | 5/1982 | Brown | 43/42.09 |
| 4,912,871 | 4/1990 | Brady | 43/43.26 |
| 5,216,830 | 6/1993 | Brott, II | 43/42.39 |
| 5,253,446 | 10/1993 | Ogle | 43/42.13 |
| 5,373,658 | 12/1994 | Huppert | 43/42.39 |
| 5,461,819 | 10/1995 | Shindledecker | 43/42.13 |
| 5,551,185 | 9/1996 | Reed | 43/42.39 |

*Primary Examiner*—Jack W. Lavinder
*Attorney, Agent, or Firm*—Henderson & Sturm

[57] ABSTRACT

An environmentally friendly fishing lure construction 10 and method of manufacturing wherein the lure body unit 12 comprises a weighted mass of non-toxic metallic particles 44 encapsulated in a shaped plastic body 43.

6 Claims, 1 Drawing Sheet

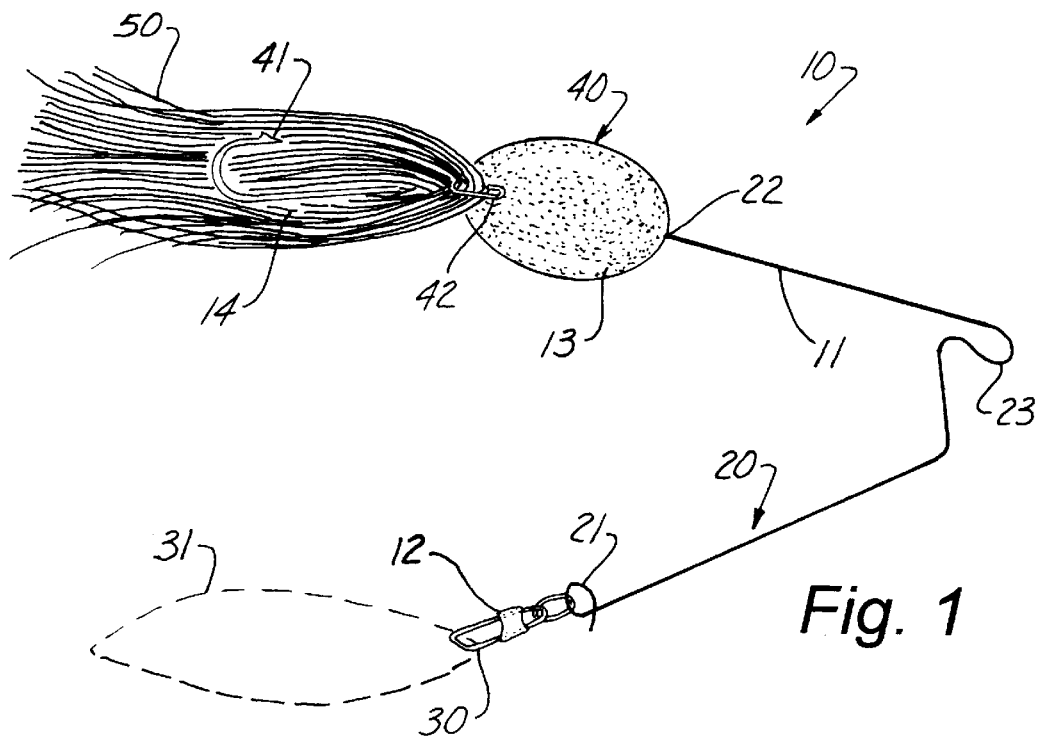
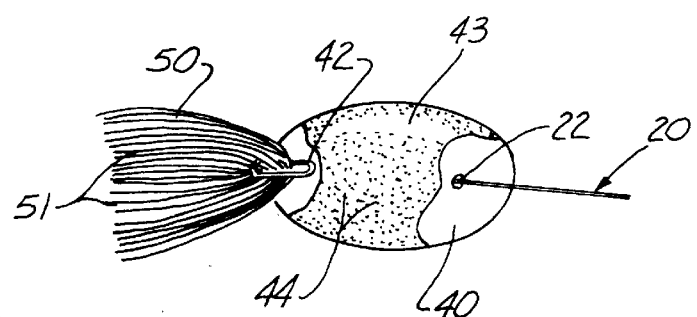
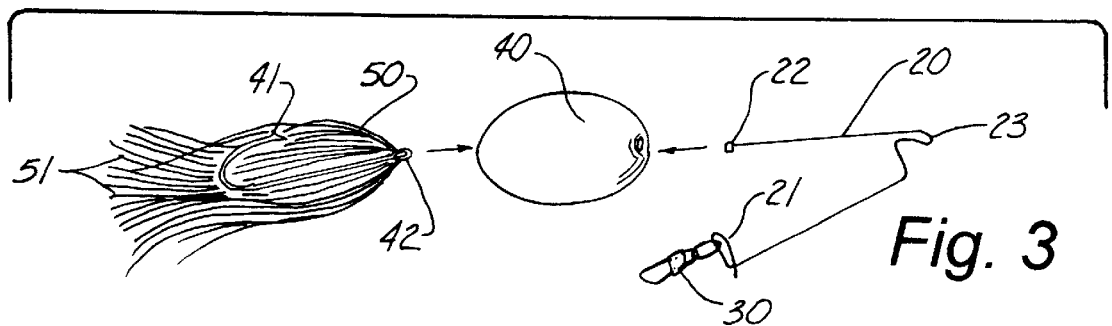

ENVIRONMENTALLY FRIENDLY FISHING LURE CONSTRUCTION

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates to the field of fishing lure constructions in general, and in particular to a non-toxic weighted lure body construction.

2. Description of Related Art

As can be seen by reference to the following U.S. Pat. Nos. 5,216,830; 5,373,658; 5,461,819; and 5,551,185, the prior art is replete with myriad and diverse fishing lure constructions.

While all of the aforementioned prior art constructions are more than adequate for the basic purpose and function for which they have been specifically designed, they are uniformly deficient with respect to their failure to provide a simple, efficient, and environmentally friendly fishing lure weighted body construction that will not introduce toxic materials into lakes, rivers, streams, etc.

As any fresh or saltwater fisherman is aware, lead weights are an integral component of virtually all types of terminal fishing tackle and while lead is an abundant inexpensive and easily worked material, it also contains toxic elements that may be absorbed or ingested by fish or waterfowl with deleterious effects.

As a consequence of the foregoing situation, there has existed a longstanding need for a new and improved weighted lure body construction that would combine readily available non-toxic metals in a chemical matrix which would encapsulate the metals to provide an environmentally friendly fishing lure construction and the provision of such an arrangement is a stated objective of the present invention.

BRIEF SUMMARY OF THE INVENTION

Briefly stated, the environmentally friendly fishing lure construction that forms the basis of the present invention comprises in general, a spring wire unit connected on one end to a swivel unit and connected on the other end in a rotatable fashion to a lure body unit having a hook unit that may optionally be provided with a skirt unit.

As will be explained in greater detail further on in the specification, the lure body unit comprises a plastic lure body that is impregnated with a mass of non-toxic metallic filings, shavings, grindings, or other metal manufacturing waste products. The plastic encapsulates the metal components which add weight to the lure body unit.

There are two different methods contemplated for use in the fabrication of the lure body unit. The first method involves mixing the metallic waste products with one or more of the chemical components of epoxy and casting the mixture into a lure body mold. The second method involves the injection molding process wherein the metal filings would be mixed with the softened plastic as it passes out of the injection pump and into the mold to encapsulate the filings within the cured plastic carrier.

In addition to providing weight to the finished lure body, the metal filings will also provide reflective surfaces within clear epoxy or plastic that will function as myriad fish attractors.

BRIEF DESCRIPTION OF THE SEVERAL VIEWS OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of the environmentally friendly fishing lure construction that forms the basis of the present invention;

FIG. 2 is a partial cut away view of the lure body unit; and

FIG. 3 is an exploded perspective view of the fishing lure construction.

DETAILED DESCRIPTION OF THE INVENTION

As can be seen by reference to the drawings, and in particularly to FIG. 1, the environmentally friendly fishing lure construction that forms the basis of the present invention is designated generally by the reference number 10. The lure construction 10 comprises in general, a wire unit 11, a swivel unit 12, a lure body unit 13, and an optional skirt unit 14. These units will now be described in seriatim fashion.

As can best be seen by reference to FIGS. 1 and 3, the wire unit 11 comprises an elongated contoured steel spring wire member 20 having a closed loop element 21 formed on one end of a first section and operatively associated with the swivel unit 12 and an enlarged head element 22 formed on the other end of the second section of the wire unit and operatively associated with the lure body unit 13. The intermediate portion of the wire member 20 is provided with a loop segment 23 which is intended to be connected to a fishing line (not shown) in a well recognized fashion.

Still referring to FIGS. 1 and 3, it can be seen that the swivel unit 12 comprises a conventional swivel member 30 which is intended to be connected to a spinner blade element 31 also in a well recognized fashion.

Turning now to FIGS. 1 and 2, it can be seen that the lure body unit 13 comprises a weighted lure body member 40. The lure body member 40 is rotatably connected on one end to the enlarged head element 22 of the spring wire member 20 and is connected on the other end to a hook member 41 via an eyelet 42 which is embedded in the lure body member 40 as will be explained presently.

As can best be seen by reference to FIG. 2, the lure body member 40 comprises a shaped plastic body 43 which encapsulated discrete particles of non-toxic metal 44 such as steel, brass, aluminum, copper, bismuth, etc., in a manner which will be described in greater detail further on in the specification.

In addition, as shown in FIGS. 1 through 3, the lure body unit 13 may optionally be provided with a skirt unit 14 comprising a skirt member 50 fabricated from strips 51 of non-toxic material such as rubber, plastic, metal, foil, etc. The skirt member 50 is captively secured to the lure body member 40 via the eyelet element 42 in a well recognized fashion.

As was previously mentioned in the specification, the particles 44 of non-toxic metals comprise waste material from other machining processes that normally have no appreciable commercial value and are reclaimed specifically for use in the lure construction 10 of this invention.

In addition to providing weight to the lure body member 40, these particles 44 also provide light reflecting facets when employed in a clear or translucent plastic carrier medium 43 and this reflective characteristic also serves as a fish attractant in that it mimics the flash of scales on bait fish.

Given the fact that all of the components employed in the finished lure construction are non-toxic and environmentally friendly, the inevitable loss of the fishing lure in a body of water will not have any undesired environmental impact and the manufacturing steps employed in the fabrication of the lure body member will now be described in detail.

The fishing lure construction 10 may be manufactured using two different methods, both of which produce the same end effect. The first method uses the casting process utilizing epoxy. Epoxy is a two-part mix plastic compound which has its bonding characteristics based in the chemical reaction between a hardener and a resin component. When the two are brought together, they begin forming a molecular bond which turns the compound into a solid plastic form. The metal filings may be mixed into the epoxy in several ways. A slower curing epoxy could have the filings mixed into the combined resin/hardener mixture after they are brought together and mixed, or the metal filings could be added to one of the single components before mixing begins. Mixing the epoxy together and then adding the filing would provide a more stable product, however, since a slower hardening epoxy should be used, production turn-around time would be reduced. Additional components such as the stainless steel hook attachment and the weights with the associated tassels would be added in after the fact, held in place by the curing epoxy. The lure body attachment head 22 which attaches to the front of the main body 40 components has a "mushroom" shape which has a small amount of light lubricant added. This allows the material 43 not to glue or attach to the stainless steel part, allowing it to swivel inside the plastic lure body member 40.

The second method of manufacturing would provide the fastest and least expensive of manufacturing, and is more suitable for "mass production". The primary component of the lure construction 10 may be manufactured using the plastic injection molding process. Injection molding is a plastic molding procedure whereby heat softened plastic material is forced under very high pressure into a metal cavity mold which is relatively cool. Acceptable metals for the mold are aluminum and steel. The inside cavity of the mold is comprised of two or more halves, and is the same desired shape as the product to be formed. High pressure hydraulics are used to keep the mold components together during the actual injection phase of the molding process. The metal filings would be added to the softened plastic as it works its way through the injection pump where it is its most pliable. This would provide the same "suspended" effect as the metal filings inside the epoxy. All of the added components such as the stainless steel hook attachment components and the weights, as well as the tassels could be added inside the cavity of the mold. The injected plastic would form around these parts to secure them in place. Because the plastic is a thermoset, it is allowed to cool and harden. The hydraulics holding the multiple component cavity together are released, the halves of the mold separated, and the solid formed plastic item removed. Injection molding can be a highly automated process and is capable of producing extremely detailed parts at a very cost effective price. Lubricant is added to the stainless steel component as mentioned in the epoxy version. This process should be invaluable for producing the fishing lure construction in a cost effective manner.

Although only an exemplary embodiment of the invention has been described in detail above, those skilled in the art will readily appreciate that many modifications are possible without materially departing from the novel teachings and advantages of this invention. Accordingly, all such modifications are intended to be included within the scope of this invention as defined in the following claims.

Having thereby described the subject matter of the present invention, it should be apparent that many substitutions, modifications, and variations of the invention are possible in light of the above teachings. It is therefore to be understood that the invention as taught and described herein is only to be limited to the extent of the breadth and scope of the appended claims.

We claim:

1. A fishing lure comprising,
    a spring wire member having a first section, a second section having a longitudinal axis and a loop segment positioned between the first and second sections;
    a spinner blade element attached to an end of the first section of the spring wire member with a swivel unit to allow the spinner to rotate and move in the water as the lure is pulled through the water;
    a lure body unit attached to an end of the second section of the spring wire element having a shaped plastic lure body member encapsulating a weighted mass of non-toxic metallic particles and an eyelet element wherein a hook member and a skirt unit are attached to the eyelet element; and,
    a rotatable connecting device comprising an enlarged head element attached to the end of the second section and encapsulated by the shaped plastic lure body member for rotatably connecting the lure body unit to the end of the second section to allow the lure body unit to only rotate about the longitudinal axis.

2. The lure construction as in claim 1 wherein the weighted mass of non-toxic metallic particles is chosen from among the following: steel, aluminum, brass, copper, bismuth.

3. The lure construction as in claim 1 wherein said shaped plastic body is at least partially translucent.

4. The lure construction as in claim 1 wherein the lure body unit has an eyelet element embedded in one end and the other end of the lure body unit is connected to the end of the second section of the spring wire member.

5. The lure construction as in claim 4 further including a hook member operatively connected to said eyelet element.

6. The lure construction as in claim 5 further including a skirt member operatively associated with said eyelet element.

* * * * *